Aug. 7, 1945.  E. C. TANNER  2,381,013
REFRIGERATION APPARATUS
Filed Nov. 5, 1943
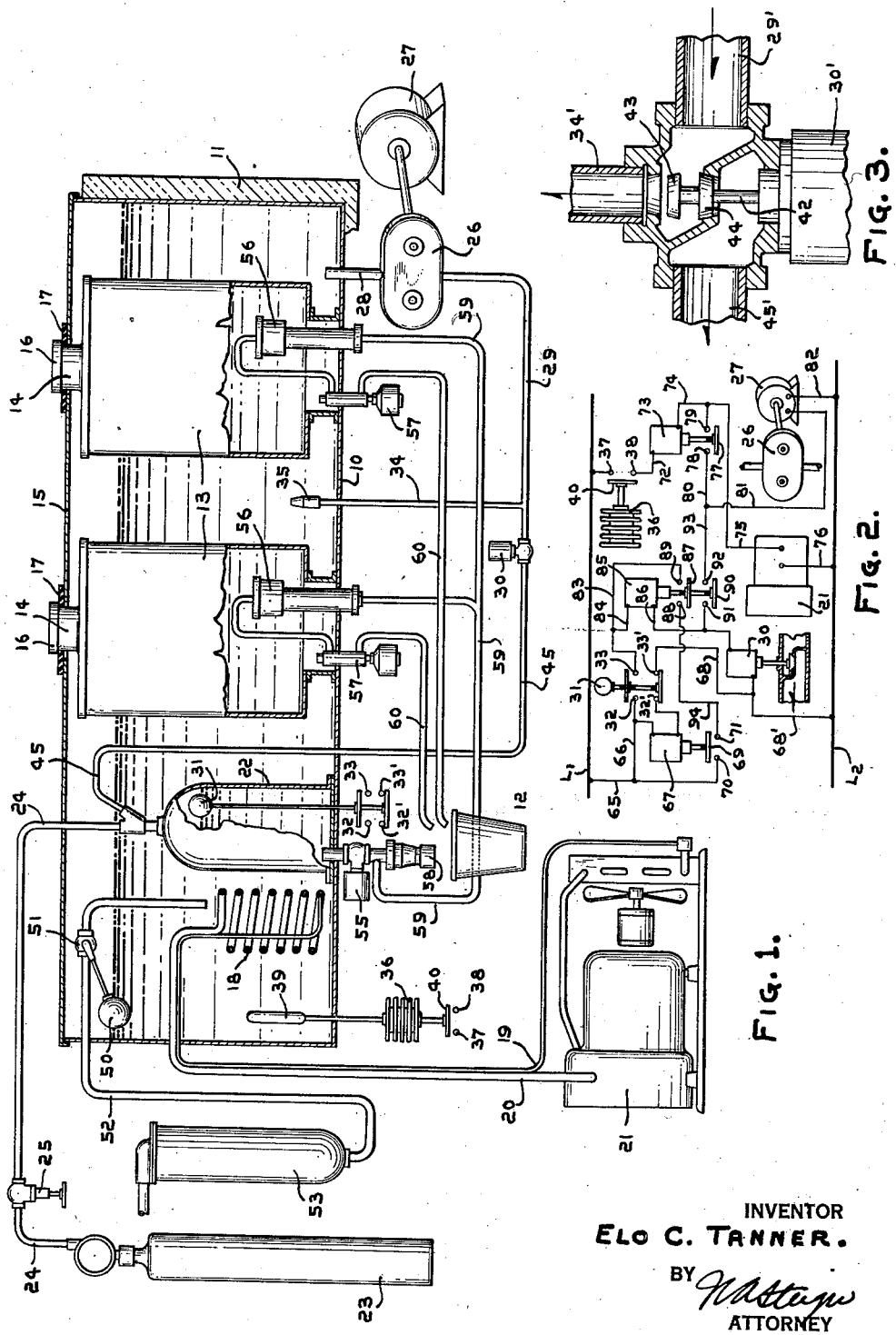
INVENTOR
ELO C. TANNER.
BY
ATTORNEY Patented Aug. 7, 1945

2,381,013

UNITED STATES PATENT OFFICE 2,381,013

REFRIGERATION APPARATUS

Elo C. Tanner, Springfield, Mass., assignor to Westinghouse Electric Corporation, East Pittsburgh, Pa., a corporation of Pennsylvania Application November 5, 1943, Serial No. 509,087

5 Claims. (Cl. 62—141)

This invention relates to drink dispensing apparatus and particularly to apparatus of the type disclosed in my copending application, Serial No. 492,786, filed June 30, 1943, for Refrigerating apparatus.

In that application I have described a beverage dispensing apparatus wherein the water component of a mixed beverage is directly cooled by a mechanical refrigerating apparatus and the cooled water component is used to cool the carbonator, one or more syrup tanks, and the various water and syrup pumps and valves. A pump is provided to force water into the carbonator, and a motor driven agitator is provided to circulate the water bath.

The present invention eliminates the separate agitator by using the carbonator pump as a means for positively circulating the water in the bath.

The apparatus is so constructed and arranged that a device responsive to the liquid level in the carbonator serves to actuate the pump to supply water to the carbonator. A device responsive to the temperature of the water bath serves to control the operation of both the refrigerating unit and the water pump to effect positive circulation of the water in the bath as it is being refrigerated and so to maintain the bath temperature substantially uniform. Preferably the water pump has sufficient capacity to supply the carbonator and circulate the water bath simultaneously should conditions so require.

These and other objects are effected by my invention as will be apparent from the following description and claims taken in connection with the accompanying drawing, forming a part of this application, in which:

Fig. 1 is a schematic representation of a drink dispensing apparatus embodying my invention;

Fig. 2 is a wiring diagram for the apparatus shown in Fig. 1; and

Fig. 3 is a vertical sectional view through an alternative form of electrically operated valve mechanism which may be used with the apparatus of Fig. 1 to control the path of flow of the cooled water.

A tank 10, preferably insulated as indicated at 11, provides a receptacle for the water component of the mixed beverage which is dispensed into a cup 12. One or more syrup tanks 13, here shown as two in number, are disposed inside the tank 10. Each tank 13 is provided with a filling neck 14 extending through the top removable cover 15 of tank 10. A cap or closure 16 is provided for each syrup tank, and a removable gasket 17 may be disposed around each neck 14 above the cover 15 to prevent syrup from dripping into the water tank when the receptacle 13 is being filled.

The flow of water into tank 10 is controlled by any suitable mechanism, here shown as a float 50 operatively connected to a valve mechanism 51 disposed in the inlet water line 52 which may be connected to a city water supply or other source of water under pressure. A filter 53 may be interposed between the source and the valve 51.

The water component in tank 10 is cooled by a refrigerant evaporator 18 operatively connected by suitable conduits 19 and 20 with a condensing unit 21. A carbonator 22 is also disposed in the tank 10 and is cooled by the water in that tank. The carbonator, which may be of any selected type, is supplied with carbon dioxide from a cylinder 23 through conduit 24 and pressure-reducing valve 25. Pre-cooled water is delivered to the carbonator by means of a pump 26 driven by a motor 27. The pump 26 is preferably of the positive displacement type, capable of generating a head pressure of 150 pounds or more per square inch. The inlet of the pump is connected by a conduit 28 with the bottom of tank 10, and the discharge end is connected by conduits 29 and 45 with the carbonator 22. Flow of water through these conduits to the carbonator is controlled by a solenoid valve 30.

The liquid level in the carbonator is controlled by any suitable means, here indicated as a float 31, which makes and breaks an electrical circuit through contacts 32, 33, and 32', 33', solenoid 30 and pump motor 27. Thus when the carbonator needs water the float 31 lowers to close a circuit across contacts 32, 33, whereupon the solenoid valve 30 and pump motor 27 are energized so that the pump 26 can deliver water through conduit 29, past the open valve 30 and through conduit 45 to the carbonator. Likewise, when a predetermined high level has been reached, the circuit through contacts 32, 33 is opened and another circuit through contacts 32', 33' is closed, as is hereafter described, to break the circuit through the solenoid valve 30 and pump motor 27.

Agitation of the water in tank 10 is caused by pumping water from the tank through conduit 28, pump 26, conduit 29, conduit 34 and restricted outlet 35 back to tank 10. Should the solenoid valve 30 be closed, all the water passing through the pump 26 will be recirculated through the conduit 34 to the tank. Should valve 30 be opened in response to a lowering of the float 31, some of the water from the pump will be supplied to the carbonator and another part will be recirculated through the tank.

Preferably the pump 26 is started and stopped by a temperature-responsive device, such as bellows 36 which through contacts 37, 38 also controls the operation of the refrigerant condensing unit. A bulb 39 immersed in the water in tank 10 contains a temperature-responsive medium which expands when a predetermined water temperature, say 40° F., has been reached causing bellows 36 to extend, thereby causing contactor 40 to bridge contacts 37, 38 and close an electrical circuit energizing the motor for the condensing unit 21 and also the motor 27 for the pump 26. When the temperature of the water has been reduced to a predetermined degree, say 36° F., the bellows 36 contracts to open the circuit across contacts 37, 38, stopping operation of the condensing unit and the water pump.

In Fig. 3 I have shown an alternative valve arrangement for controlling the flow of water to the carbonator in response to the float 31. In this embodiment the solenoid 30' when energized, moves the valve stem 42 upwardly to seat valve 43 and unseat valve 44. Thus water flowing through conduit 29' from the pump 26 will pass valve 44 and flow through conduit 45' to the carbonator 22. At the same time valve 43 stops the flow of water from conduit 29' through conduit 34' back to tank 10. By this arrangement the entire amount of water propelled by pump 26 is directed either to the carbonator or back to tank 10 as conditions require. This permits the use of a smaller capacity pump than with the arrangement shown in Fig. 1, but on the other hand no circulation of water through the tank 10 can be had should both the carbonator control and the temperature control close their respective circuits.

Fig. 2 shows a preferred wiring diagram for the apparatus previously described. In this figure, the circuit is shown with the operating parts in the position they assume when the carbonator float 31 is in its high level position and with the refrigerant compressor and pump motor at rest. The main power conductors are designated as $L_1$ and $L_2$.

When the float is at its high level position, as shown in this figure, the circuit through contacts 32, 33 is open and the circuit through contacts 32', 33' is closed. Current now passes from line conductor $L_1$ through conductor 65, conductor 66, solenoid 67, contacts 32', 33', and conductors 68 and 68' to line conductor $L_2$. The solenoid 67, when energized, raises contactor 69, breaking a circuit through contacts 70, 71. Thus, assuming the thermostat contacts 37, 38 are open as shown, all circuits between the two line conductors are deenergized except that through solenoid 67, and both the pump motor 27 and the refrigerant compressor are at rest.

If, in this position, the water bath in tank 10 should rise in temperature sufficiently to cause the closing of contacts 37, 38 by the expansion of bellows 36, current will be supplied from line conductor $L_1$ through contacts 37, 38, conductor 72, solenoid 73, conductors 74 and 75, compressor unit 21 and conductor 76 to line conductor $L_2$, starting the compressor unit. The energization of solenoid 73 causes contactor 77 to bridge contacts 78, 79. Current then flows from conductor 74 through contacts 78, 79, conductors 80 and 81, pump motor 27 and conductor 82 to line conductor $L_2$. Thus, both the water pump and refrigerating unit are started in response to a high water temperature.

Reverting to the position shown in Fig. 2, when sufficient water is drawn from the carbonator to drop the float 31 far enough to break the contacts 32', 33', but not far enough to bridge the contacts 32, 33, the solenoid 67 will be deenergized and contactor 69 will bridge contacts 70, 71, conditioning the circuit for the succeeding operation, but no circuit will be energized until the float has dropped low enough to close contacts 32, 33. When this occurs, current flows from line conductor $L_1$ through conductors 65 and 66, contacts 32, 33, conductors 83 and 84, solenoid 85, conductor 86, solenoid valve 30 and conductor 68' to line conductor $L_2$. The solenoid 85 being energized, contactor 87 bridges contacts 88, 89 and contactor 90 bridges contacts 91, 92. Current then flows from conductor 86 through contacts 91, 92, conductors 93 and 81, pump motor 27 and conductor 82 to line conductor $L_2$, starting the pump to supply water to the carbonator, as the solenoid valve 30 is energized and open.

As the float 31 rises, the circuit through contacts 32, 33 is broken, but a holding circuit for solenoid 85 is maintained from line conductor $L_1$ through conductor 65, contacts 70, 71, conductor 94, contacts 88, 89, conductors 83, 84, solenoid 85, conductor 86, solenoid 30 and conductor 68' to line conductor $L_2$. This condition is maintained until the float rises sufficiently high to close the circuit through contacts 32', 33', energizing solenoid 67, opening contacts 70, 71 to deenergize the holding circuit and restore the parts to the position shown in Fig. 2, with the pump motor at rest.

In the embodiment shown in Fig. 1, the pump is of sufficient capacity to supply water to the carbonator and also to circulate the water bath in the event that both the float and the thermostat close their circuits concurrrently. In the embodiment shown in Fig. 3, water will be shunted to the carbonator when it requires water regardless of whether the refrigerant compressor is operating, but this makes no material difference as the carbonator fills in a few seconds while the refrigerating cycle is usually of considerably longer duration.

The beverage dispensing system, which forms no part of the present invention, comprises a solenoid-operated carbonated water valve 55 connected to the carbonator 22, a syrup pump 56 and a solenoid-operated syrup valve 57 associated with each syrup tank 13. When the electro-magnet of the carbonated water valve is energized through a suitable circuit controlled by a coin-operated device or a manually-operated means (not shown), cold carbonated water flows from the carbonator 22 through the valve 55 and nozzle 58 to the cup 12. At the same time the solenoid-operated syrup valve controlling flow from the selected syrup tank is opened. The carbonated water flowing past valve 55 is under considerable pressure and, through a by-pass 59, some of this water is used to actuate the syrup pump 56. Syrup will flow to the cup through conduit 60 however, only from that tank whose syrup valve has been energized by the syrup selecting mechanism. Suitable timing mechanism (not shown) regulates the energization of the syrup and carbonated water circuits to regulate the quantity of fluid dispensed.

The control of the flow of water from the storage tank to the carborator or back to the tank, selectively or simultaneously, together with the use of a single pump for both supplying water to the carbonator and for agitating the water in the tank afford a useful, compact and efficient water cooling and carbonating system which has many applications.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In combination, a tank for storing water, means for cooling the water in the tank, a carbonator, pump means for supplying water to the carbonator from said tank, means responsive to the liquid level in the carbonator for controlling operation of said pump means, and means including said pump means for agitating the water in said tank.

2. In combination, a tank for storing water, motor-driven means for cooling the water in the tank, a carbonator, motor-driven pump means for supplying water to the carbonator from said tank, means responsive to the liquid level in the carbonator for controlling operation of said pump means only, and means responsive to the temperature of the water in said tank for controlling operation of both said pump means and said motor-driven cooling means.

3. In combination, a tank for storing water, a carbonator, pump means for supplying water to the carbonator from said tank, electrically-operated valve means for controlling the flow of water from the tank to the carbonator, means responsive to the liquid level in the carbonator for controlling operation of both said pump means and said electrically-operated valve means, and means including said pump means for agitating the water in the tank.

4. In combination, a tank for storing water, motor-driven means for cooling the water in the tank, a carbonator, pump means for supplying water to the carbonator from said tank, electrically-operated valve means for controlling the flow of water from the tank to the carbonator, means responsive to the liquid level in the carbonator for controlling operation of both said pump means and said electrically-operated valve means, and means responsive to the temperature of the water in the tank for controlling the operation of the pump means and the motor-driven cooling means only.

5. In combination, a tank for storing water, a carbonator, a pump responsive to the temperature of water in the tank for periodically agitating the water therein, and means responsive to the liquid level in the carbonator for also controlling operation of said pump and for periodically directing water flow from the tank through the pump to the carbonator.

ELO C. TANNER.